March 24, 1931.  A. WEIS ET AL  1,797,278
WEB CUTTING MECHANISM
Filed Oct. 27, 1928  2 Sheets-Sheet 1
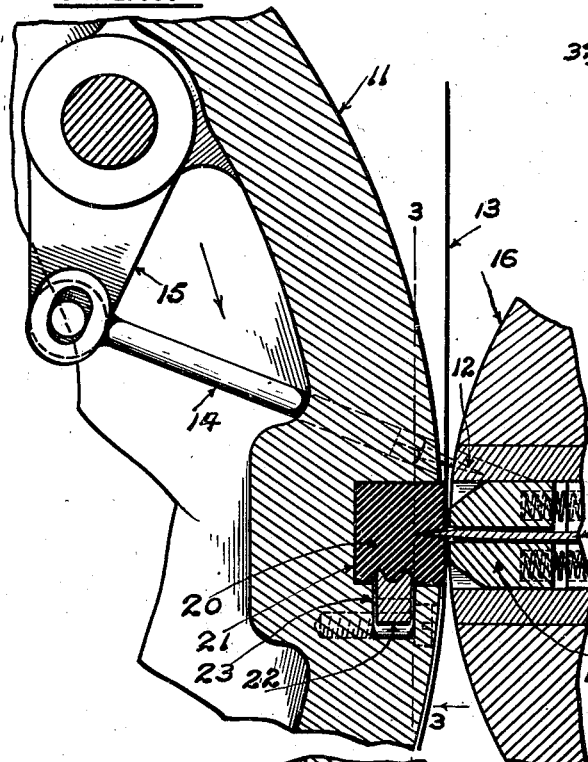
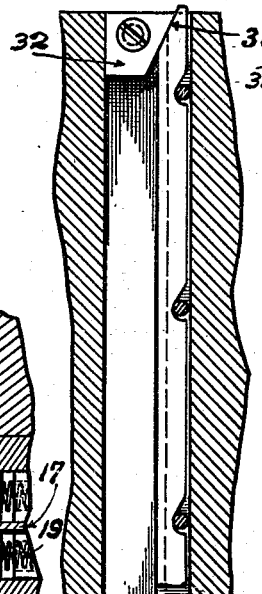
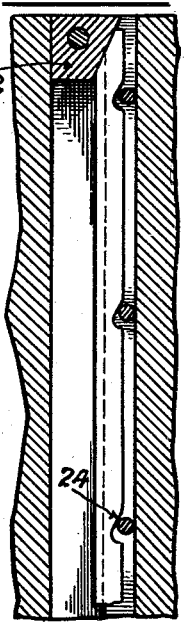
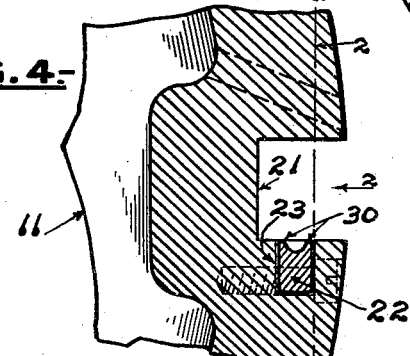
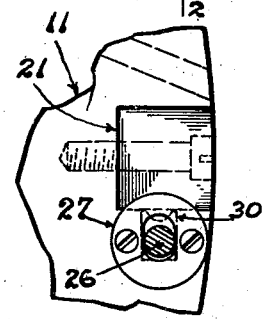
INVENTORS.
August Weis
By Frank Schippers
John R. Tomlin
ATT'Y.

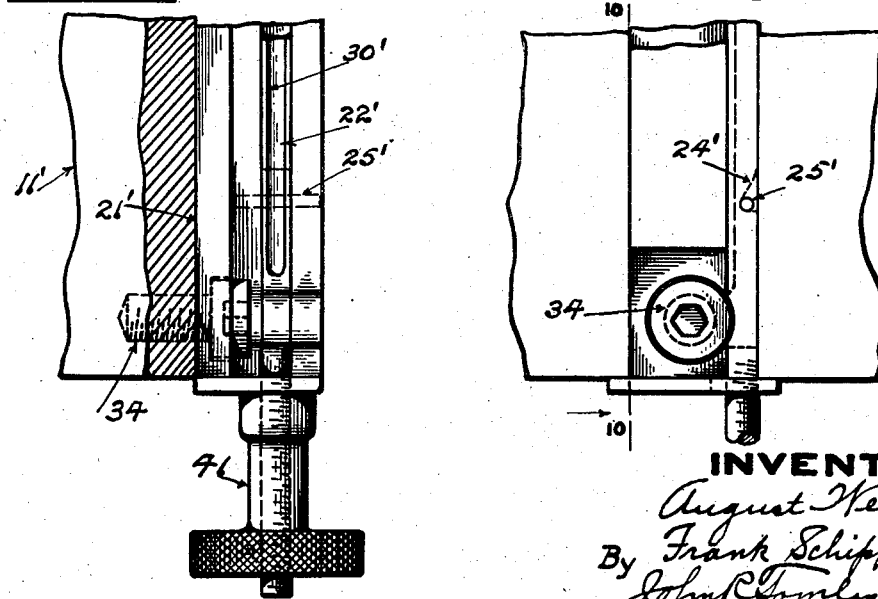

Patented Mar. 24, 1931

1,797,278

UNITED STATES PATENT OFFICE

AUGUST WEIS AND FRANK SCHIPPERS, OF BROOKLYN, NEW YORK, ASSIGNORS TO R. HOE & CO. INC., OF NEW YORK, N. Y., A CORPORATION OF NEW YORK

WEB-CUTTING MECHANISM

Application filed October 27, 1928. Serial No. 315,423.

The present invention relates to web cutting mechanism used in connection with cutting and folding cylinders of rotary printing machines.

In mechanism of this class the web is passed between two cylinders one of which carries a knife which projects beyond the peripheral surface of the cylinder, while the other cylinder carries an abutment for the knife, which usually consists of a piece of soft rubber moulded in the form of a bar and clamped in a channel shaped holder which is mounted on the cylinder so that the cutting knife engages with the rubber bar as the cylinders rotate, and the web passing between the cylinders is thus cut into sheets.

As heretofore arranged, it has been necessary to remove the holder from the cylinder in order to insert a new rubber therein, and the time required for this operation has delayed the operation of the machine.

The invention disclosed herein provides a convenient means for quickly removing the cutting rubber and replacing it, without removing any other parts.

An object of the invention is to provide a cutting cylinder having means for firmly holding the abutment for the cutting knife of a web severing mechanism, and means whereby the abutment may be quickly removed for turning or replacement, and quickly inserted and secured in position.

It is also an object of the invention to provide an abutment holding means for web cutting mechanism that is of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

In the accompanying drawings:

Figure 1 is a fragmentary view partly in section, of the engaging portions of a folding cylinder and its cooperating cutting cylinder, showing a transverse section of a rubber cutting abutment and the locking bar of the invention.

Figure 2 is a sectional view of a portion of the folding cylinder with the cutting abutment removed and with the locking bar in the unlocked position, the view being taken on the line 2—2 of Figure 4, and in the direction of the arrow.

Figure 3 is a sectional view similar to Figure 2, but showing the cutting abutment locked in position, the parts appearing as viewed on the line 3—3 of Figure 1.

Figure 4 is a sectional view of a portion of the folding cylinder similar to Figure 1, but with the locking bar in the unlocked position and with the cutting abutment removed.

Figure 5 is a fragmentary view partly in section showing a portion of the end of the folding cylinder as it appears in the direction of arrow 5 of Figure 2.

Figure 6 is a view of a portion of a cutting cylinder, partly broken away and partly in section, showing a modified form of the invention, adapted to folding cylinders designed to receive the usual form of cutting abutment holder.

Figure 7 is a fragmentary view of a portion of the device as shown in Figure 6 with certain parts broken away in order to show a sectional view of a modified means for automatically retracting the locking bar.

Figure 8 is a fragmentary view of one end of the folding cylinder as viewed in the direction of arrow 8 of Figure 6.

Figure 9 is a fragmentary sectional view of the device as viewed in the direction of arrow 9 of Figure 7; and Figure 10 is a sectional view of the folding cylinder shown in Figure 6, as viewed on the line 10—10 and in the direction of the arrow.

Referring to the drawings 11 indicates a folding cylinder of a kind well known in the art, and provided with pins one of which is shown at 12 in engagement with the web 13.

A pin holder is shown at 14 with its operating arm at 15, these parts being of the usual construction.

Cooperating with the folding cylinder is a cutting cylinder 16, having a cutting knife 17, the edge of which projects a short distance outside the periphery of the cylinder 16. This knife and its check blocks 18, which have springs 19, are also of well known form.

The cutting abutment 20 which is usually made of relatively soft rubber and has heretofore been secured to a holder that may be removed from the cylinder, is preferably supported in a groove 21 cut in the peripheral wall of the cylinder 11, and forms an abutment for the knife 17 so that the web is severed at the point where they engage.

The locking bar 22 is slidably supported in the recess 23 and has notches 24 spaced along its length. These notches engage with pins 25 as will be hereinafter explained.

A threaded stud 26 formed on the end of the bar projects through the slotted washer 27 fitted in the end of the cylinder 11. A spring 28 presses against the washer and tends to force the locking bar in one direction while the nut 29 serves to move the bar in the opposite direction.

When the nut 29 is turned to draw the locking bar forward, the sloping sides of the notches 24 are drawn past the pins 25, causing the locking bar 22 to move obliquely toward the cutting abutment and to the position shown in the Figures 1 and 3, so the projections 30 formed on the grooved edge of the locking bar, grip the cutting abutment and securely hold it in position. When the nut 29 is loosened, the spring 28 forces the locking bar back, the sloping sides of the notches 24 no longer bear against the pins 25, and the expansion of the rubber cutting abutment forces the locking bar back into the recess 23, so the cutting rubber may be removed and turned to present a new surface to the knife 16 or it may be replaced with a new rubber; either operation taking but a small fraction of the time required for changing the cutting rubber holder heretofore used.

The end of the locking bar 22 is formed with a bevel 31, and a correspondingly beveled block 32 is secured in the back end of the groove 21. The slope of the bevel 31 is made parallel with the sloping sides of the notches 24 and when the bar is forced back by the spring 29, even though there is no cutting abutment in the groove 21, the bar will be forced back into the recess 23 by the engagement of the bevel 31 with the block 32.

There are many folders in use that have folding cylinders adapted to use the cutting rubber-holders heretofore made, and the modified form of invention shown in Figures 6 to 10 inclusive is especially adapted to be used in such folders. In this form, the locking bar and co-acting parts are carried in a modified form of holder which is made interchangeable with the usual cutting abutment holder and may be permanently mounted in the folding cylinder. The locking bar and the method of operating it however, are substantially the same as in the form shown in Figures 1 to 5 inclusive.

In the modified form of the invention shown in Figures 6 to 10 inclusive the parts that correspond with those shown in Figures 1 to 5 inclusive are indicated by the same numerals primed.

The holder 33 is held in the folding cylinder by the screw 34 and the plate 35 which is flush with the cylinder surface and held thereto by screws 36. It will be understood that when the screw 34 is removed, the holder 33 can be moved toward the end of the cylinder from which the screw 34 was removed, and it can then be withdrawn. However, it is not necessary to remove the holder in order to turn or replace the rubber cutting abutment for this can be accomplished by releasing the locking bar 22'.

In the modified form of the invention shown in Figure 6, the locking bar spring is shown at 37 in engagement with the L shaped end of the locking bar 22' which is beveled at 38 and engages a correspondingly beveled surface on the block 39 secured to the end of the cylinder by screws 40. In this form a hand nut 41 is employed to operate the locking bar 22'.

What we claim is:

1. In a means for holding a cutting abutment for a web severing mechanism of the class described, a member having a groove for receiving said abutment and a lateral recess opening into said groove, a locking bar fitted to slide in the recess and having a threaded stud, a nut for the stud, an abutment for the nut, and sloping surfaces on the bar and cooperating abutting members therefor in the recess, whereby when the nut is tightened, the sloping surfaces and their abutting members cause an oblique motion to be imparted to the bar to move it into clamping engagement with the cutting abutment.

2. In a rotary web cutting mechanism, a knife supported in a rotating carrier, a rotating cylinder having a groove adapted to receive a cutting abutment for the knife, a recess opening into one side of the groove, a locking bar fitted to slide in the recess, means for moving the bar longitudinally in the recess and mechanism for simultaneously moving it outward from the recess into locking engagement with one side of the abutment.

3. In the means for holding a cutting abutment for a web severing mechanism of the class described, a member having a groove for receiving said abutment, a lateral recess opening into said groove, a locking bar fitted to slide in the recess, sloping surfaces on the bar, members in the recess adapted to cooperate with said sloping surfaces, and means to so move the bar that the sloping surfaces and the cooperating members will co-act to move the bar into clamping engagement with the abutment.

4. In a means for holding a cutting abutment for a web severing mechanism of the class described, a member having a groove for receiving said abutment, a lateral recess opening into said groove, a locking bar positioned in the recess and adapted to engage the abutment, means for moving the locking bar longitudinally in the recess, co-acting means for moving the locking bar outward from the recess and into clamping engagement with the abutment when the bar is moved longitudinally in one direction, and means for retracting the bar into the recess when it is moved longitudinally in the opposite direction.

In testimony whereof, we affix our signatures.

AUGUST WEIS.
FRANK SCHIPPERS.